Ackley & Truax.
Cans.

N° 53,765. Patented Apr. 10, 1866.

Witnesses:

Inventors:
John T. Ackley
John K. Truax

UNITED STATES PATENT OFFICE.

JOHN T. ACKLEY AND JOHN K. TRUAX, OF PHILADELPHIA, PENNSYLVANIA.

IMPROVEMENT IN THE MANUFACTURE OF CANS.

Specification forming part of Letters Patent No. 53,765, dated April 10, 1866.

*To all whom it may concern:*

Be it known that we, JOHN T. ACKLEY and JOHN K. TRUAX, of Philadelphia, in the county of Philadelphia and State of Pennsylvania, have invented a new and useful Improvement in Cans; and we do hereby declare that the following is a full, clear, and exact description thereof, which will enable those skilled in the art to make and use the same, reference being had to the accompanying drawings, forming part of this specification, in which—

Figure 1:
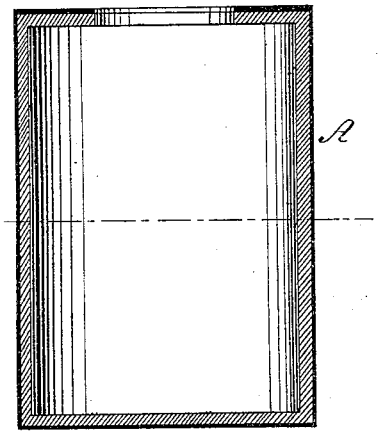
Figure 2:
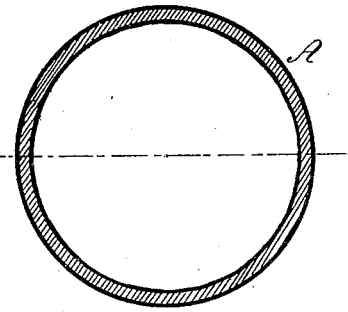

Figure 1 is a vertical section of a can made according to our invention. Fig. 2 is a horizontal section.

Similar letters of reference indicate corresponding parts.

The object of this invention is to produce a can, made wholly or partly of paper or pasteboard, which will hold greasy and corrosive solids, fluids, and liquids without leaking or oozing through its walls. The inner surface is coated with a resinous or bituminous cement, so as to protect the substance of which the can is made from the action of its contents, whereby a can composed wholly or partly of paper can be made capable of holding solids or liquids of a greasy or volatile and penetrating character. The outside may be coated likewise, if desired, and the lid or cover is also protected by the same means.

The letter A designates a can made of pasteboard and coated on its inside surface with a cement which adheres to the surface and protects it from contact with and the action of the liquid or fluid placed in it. By this means liquids and solids of a penetrating character, like petroleum and grease, as well as animal oils and other substances, can be put in paper cans for use or transportation without liability of loss from leakage or from the penetration or passage of the contents through their pores. The cover or lid is also coated with the cement, and may be secured in any convenient way. The outside of the can may be likewise coated, if desired, for additional safety, or the coating applied to the outside only.

The cement is applied in a liquid state, and the can so moved as to cause the material to be evenly distributed and coated over its surface. When it is hardened the can is ready for use.

The cement may be made of concentrated coal-tar, or of pitch, or of any suitable resinous or bituminous substance.

We claim as new and desire to secure by Letters Patent—

The application of pitch or a bituminous or resinous cement to the inside or outside of a box or can made wholly or partly of paper, substantially as and for the purpose above set forth.

JOHN T. ACKLEY.
JNO. K. TRUAX.

Witnesses:
LEWIS GODBON,
A. GODBON.